(No Model.)
R. D. UPHAM.
PROCESS OF MANUFACTURING ASPHALTIC PAVING CEMENT.
No. 531,984. Patented Jan. 1, 1895.
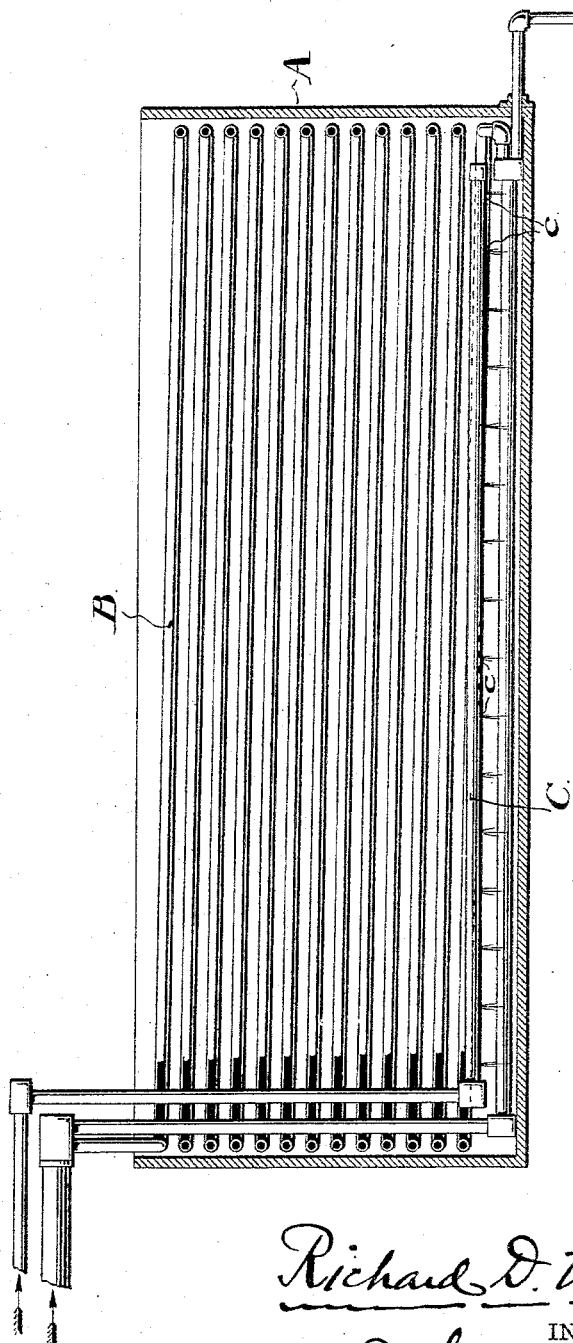
WITNESSES:
A. E. Paige
F. Norman Dixon
Richard D. Upham
INVENTOR
By his Attorneys,
Wm. C. Strawbridge
J. Bonsall Taylor

UNITED STATES PATENT OFFICE.

RICHARD D. UPHAM, OF BALTIMORE, MARYLAND, ASSIGNOR TO WALTER S. WILKINSON, OF SAME PLACE.

PROCESS OF MANUFACTURING ASPHALTIC PAVING-CEMENT.

SPECIFICATION forming part of Letters Patent No. 531,984, dated January 1, 1895.

Application filed June 4, 1894. Serial No. 513,357. (No specimens.)

*To all whom it may concern:*

Be it known that I, RICHARD D. UPHAM, a citizen of the United States, residing in the city of Baltimore and State of Maryland, have invented a certain new and useful Process of Manufacturing Asphaltic Paving-Cement, of which the following is a specification.

In United States Letters Patent No. 512,494, granted to me January 9, 1894, there is described and claimed an improved process of refining natural asphalt, which consists in subjecting it in an open tank or vessel in its crude state, and while under subjection to the action either of steam or of fire heat, to the heating and agitating influence of steam disseminated throughout it by direct injection.

In the preparation of refined asphalt for use as a paving cement,—and without regard to whether it may have been refined by the practice of the foregoing process, or of any such other process as was usual prior to the date of the invention of the said patented process,—it is necessary that the asphalt be melted by heat, and that a proper proportion of residuum of petroleum, or kindred oleaginous agent, be added, to thin or flux it to such degree of fluidity as will permit of its admixture with the stony ingredients and its subsequent intimate union therewith, to form an ultimate paving compound. The ultimate paving compound is, as is well known, either compressed by the aid of a press into a paving block, or spread upon a previously prepared surface to form a sheet pavement. For the purpose of its employment as a paving cement, it is, as stated, usual to melt the refined asphalt by any preferred application of heat in any suitable vessel, and to add to the melted asphalt an oleaginous flux, and then customary to draw off or transfer the melted and mixed product into another vessel known as the dipping vessel, within which it is, by the agency of heat, maintained in its melted and fluid condition, and from which it is dipped for introduction into the pug mill or other mixing vessel within which it is admixed with the stony ingredients.

In the operation of melting refined asphalt as heretofore conducted, in the operation also of maintaining the asphaltic paving cement in a fluid condition in the dipping vessel, and in the drawing off of the products from the vessels, it has resulted that a quantity of earthy matter mixed with valuable asphalt has settled, precipitated, or deposited itself, upon the bottom of the vessels, and has, in its subsequent necessary manual removal therefrom, been wasted or lost for useful purposes.

Obviously the waste of asphalt and the necessity for and expense of the manual removal of the deposited accretion have been disadvantageous; and, to the end of overcoming such disadvantageous conditions, my invention aims to provide a process of manufacturing asphaltic paving cement by which the melting of the refined asphalt, the mixing of it with its flux, and the maintenance of the resulting paving cement in a melted condition and in readiness for dipping or removal, may be carried on without loss of the constituent asphalt, and with the creation, so to speak, of a more homogeneous and valuable product than has heretofore been possible.

To the foregoing ends my invention, generally stated, comprehends a process of manufacturing asphaltic paving cement, which consists in maintaining an admixture of melted refined asphalt and an oleaginous flux, in a melted or fluid and thoroughly mixed and homogeneous condition, by subjecting the said admixture in an open tank or vessel, and while under subjection to the action either of steam or of fire heat, to the heating, mixing and agitating influence of steam disseminated throughout it by direct injection. In other words, I have discovered that the direct injection of steam applied to admixtures of oleaginous material and refined asphalt, while being melted and until drawn into a tank for purposes of dipping, and while in the dipping tank,—that is to say, between the completion of the operation of the refining of the crude asphalt and the commencement of the operation of the mechanical admixture of the paving cement with the stony constituents of a paving compound,—produces exceptional results, both as to quality of ultimate product and as to economy of manufacture, the earthy matter and its contained asphalt heretofore precipitated in the melting and mixing tank and also in the dipping tank, being saved, and the ultimate paving cement being of more homogeneous and uniform quality than in the practice of the old processes.

In the practice of my process as above set forth, I do not limit myself to any particular character of apparatus, and I contemplate the employment of any desired form of open tank or vessel, to which either fire or steam heat may be applied in any preferred manner, and into which steam, as the agitating agent, may be directly injected by any preferred means.

In fact, the apparatus represented and described in my Letters Patent hereinbefore referred to, is well adapted to effectuate the process of melting refined asphalt and mixing it with residuum of petroleum or other flux. In the accompanying drawings, however, I have represented a type of dipping tank adapted to effectuate the continued application of the invention, by being so constructed as to maintain the paving cement in a fluid and thoroughly mixed condition from the time it is prepared in the melting and mixing tank until the said cement is deposited in the pug mill with the stony ingredients of the pavement.

In the drawing, A is an open tank or vessel, B is a coil of steam heating pipes, conveniently following the outline of the walls and floor of the vessel, and forming, so to speak, an inner wall and floor surface. Through this coil steam for the heating of the mass is caused to circulate, being introduced from any suitable source of supply, and the condensate returned, if desired, to said source. If preferred, the coil of steam pipes may be dispensed with and fire applied directly to the tank.

C are steam injection pipes in communication with a suitable source of steam supply, and formed with discharging orifices or injectors c of any preferred character. Whatever form of apparatus be, however, employed, it is preferable that the steam, the agitating agent, be discharged directly into the mass near the bottom of the vessel—and this without regard to whether the mass be subjected to the heat of fire directly or indirectly applied to the vessel, or to the action of steam in circulation,—it being the fact that any required amount of steam may, without injury to the asphalt or paving cement be discharged into either while being thus treated,—and it being, moreover, the fact that the agitation of the mass by means of steam, whether the mass be in process of melting and mixing with oil, or afterward when in form of paving cement in process of being maintained in a melted and mixed condition, effects a material saving both in the heating agent and in the time required to melt and mix a given charge,—and this for the reason that the heat from the injected jets of steam aids in the operation of melting and mixing and of maintaining in a heated and mixed condition, whether conducted by direct application of heat or by steam in circulation. Finally, the agitation of the steam is so thorough and complete that there results an augmented product measurably due to the fact that material heretofore lost by settling to the bottom is maintained in a fluid condition as a part of a practically homogeneous admixture, the whole of which can when desired be drawn from the melting and mixing tank to the dipping tank, and dipped from the dipping tank into the pug mill or mechanical mixer.

I make no claim upon the apparatus, as such, and the details of the apparatus shown may be varied at the will of the constructer.

I have not deemed it necessary to illustrate my devices for agitating by steam in connection with a tank or kettle adapted to be heated for the melting of the charge by the direct application of flame,—for the reason that such kettles are in themselves well known, while any workman can readily apply to them such steam injection pipes as I have shown and described in connection with a kettle equipped with gangs of steam heating pipes,—and for the further reason that I prefer to apply my invention in connection with apparatus equipped with steam heating pipes and not intended to be heated by fire.

Having now described the process in which my invention resides, and an apparatus conveniently adapted to effectuate it, it is proper for me to add, that, although apparatus of kindred character has been employed in operations of rendering and refining crude asphalt, oils, fats, and similar substances, yet that my process is confined to the treatment of refined asphalt, a substance in its nature and uses dissimilar to any substance heretofore treated by kindred operations, and that, as applied to refined asphalt, the purpose of my treatment, the effect of it upon the material, and the resulting product, are all essentially new in the art.

Having thus described my invention, I claim and desire to secure by Letters Patent—

The process of manufacturing asphaltic paving cement, which consists in maintaining an admixture of melted refined asphalt and an oleaginous flux, in a melted or fluid and thoroughly mixed and homogeneous condition, by subjecting the said admixture in an open tank or vessel, and while under subjection to the action either of steam or of fire heat, to the heating, mixing and agitating influence of steam disseminated throughout it by direct injection,—substantially as and for the purposes set forth.

In testimony that I claim the foregoing as my invention I have hereunto signed my name this 24th day of May, A. D. 1894.

RICHARD D. UPHAM.

In presence of—
 ALPHONSE PATTERSON,
 EDWARD FARNHAM TODD.